Sept. 16, 1969     D. S. JUSTICE     3,466,879
METHOD AND APPARATUS FOR MAKING PILING
Filed Aug. 7, 1967
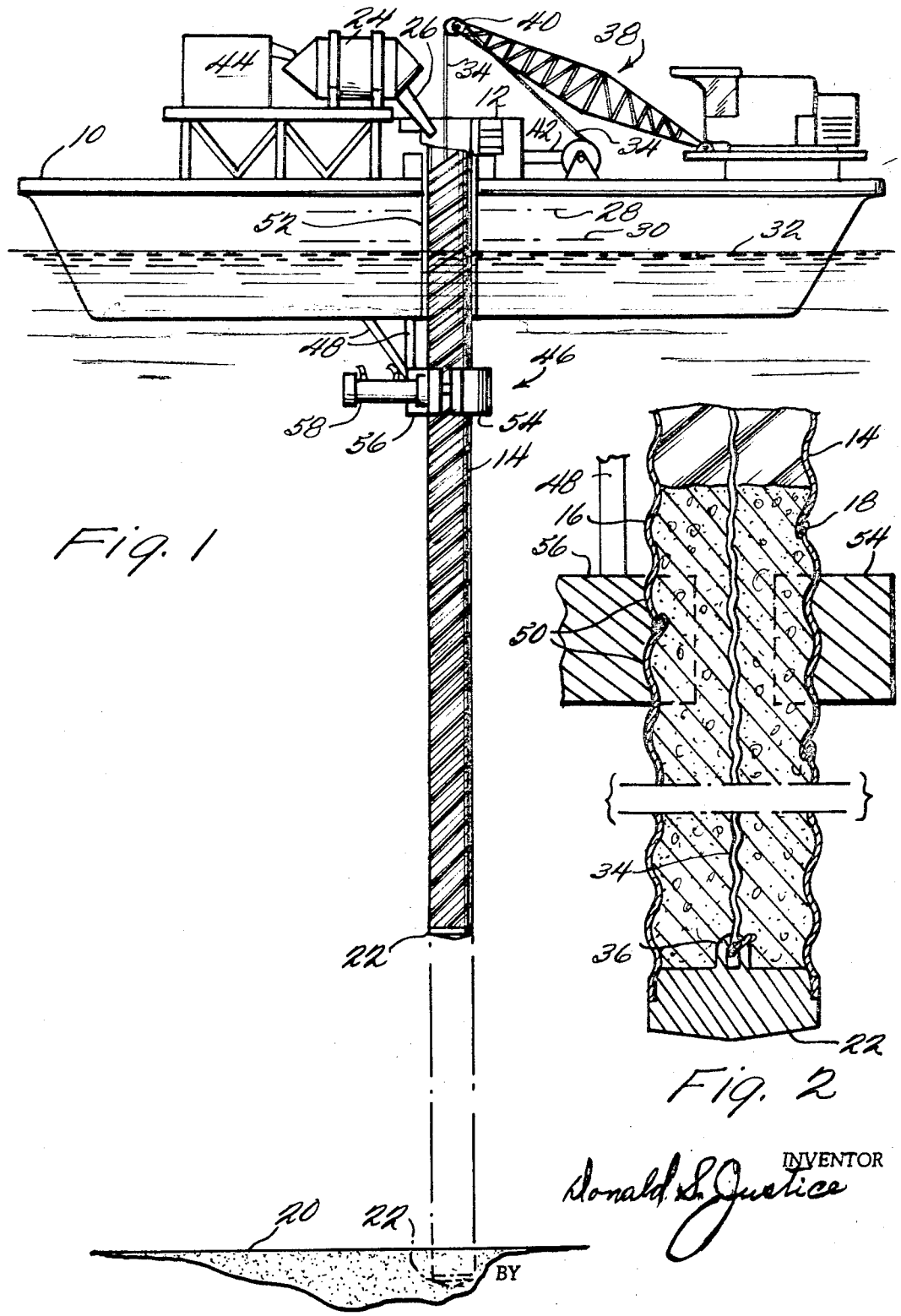

3,466,879
METHOD AND APPARATUS FOR MAKING PILING
Donald S. Justice, Washington, D.C.
(1816 N. Queens Lane, Arlington, Va. 22201)
Filed Aug. 7, 1967, Ser. No. 658,694
Int. Cl. E02d *5/40;* E04b *1/16;* B23p *19/04*
U.S. Cl. 61—53.5                                10 Claims

ABSTRACT OF THE DISCLOSURE

A spiral type conduit is continuously formed vertically and a settable material such as concrete is commensurately placed in the conduit as it is formed. This growing elongation constantly approaches its point of geo-fix as a piling. The place of using the method may range from the deep ocean to low bottom pits on land. A result is quick in-place production for the relief of otherwise awkward delivery of heavy piling, sometimes longer than transport ships. Strength is added to the pile structure by a centrally extended twisted cable attached to the conduit bottom. The cable acts as a descending support during the forming and filling operation and may remain as a permanent reinforcement.

---

This invention relates to methods and apparatus for making a piling of settable material.

In accordance with the present invention a conduit is continuously formed and a settable material such as concrete is continuously poured into the conduit as it is formed, the longitudinal axis of the conduit being arranged vertically. While no restriction as to use is contemplated, the principal use of the invention is for erecting a piling from the surface of a body of water such as the ocean to the ocean floor beneath.

According to a feature of the invention, a cable may extend centrally of the conduit and this cable may be caused to support the majority of the weight of the conduit with settable material therein during the erection process. Furthermore relative rotation can be imparted between the conduit and the cable, to twist the latter to enhance the reinforcing properties of the cable and the conditions of stress within the settable material.

According to a further feature of the invention the conduit may be formed from strip material in a helix manner and relative rotation between the cable and conduit may be achieved by causing the conduit to run through a member having internal configuration also in helix form to correspond to the helix of the conduit and therefore cause the conduit to rotate.

The various features of the invention may be best understood with reference to the attached drawing in which:

FIGURE 1 shows an illustrative embodiment of the invention, and

FIGURE 2 shows a detail of FIGURE 1.

In the drawings reference character 10 designates a floating support structure on which is mounted mechanism 12 of any conventional type for continuously forming a conduit 14 from a strip of material such as sheet metal. As is conventional, the surface of the conduit 14 will have corrugations 16 which run as a helix or screw-thread. Usually the adjoining edges of the strip are locked as indicated at 18 or otherwise overlapped and fastened. Accordingly, as the apparatus 12 is caused to function, the conduit will be formed and the lower end will proceed from the support structure downwardly toward the floor 20 of the body of water. In FIGURE 1 the bottom 22 of the conduit is shown at a position midway between the surface of the water and the floor 20 and the chain line extension shows the position that the bottom 22 will reach at a later time when more of the conduit has been formed at the apparatus 12.

As the conduit is being formed a settable material still in flowable form is delivered from apparatus 24 through a suitable delivery chute 26 into the conduit 14, the supply of the settable material being regulated to be such as to maintain the level of the settable material within the conduit as at chain line 28 beneath the conduit forming apparatus. Furthermore, in those cases where the setting of the settable material might be interfered with by water within the conduit, the rate of formation of the conduit will be regulated so that the settable material has set, at least to a state beyond interference by the water, as at level 30, before it passes beneath the surface of the water, which is designated 32.

Inasmuch as the conduit with settable material therein will achieve an appreciable weight particularly for pilings of great length, it is another feature of the invention to attach a strand member such as a conventional cable 34 to the bottom end member 22 of the conduit 14, there being any conventional attachment as indicated at 36. On the support structure 10 there may be any conventional crane or similar device as indicated at 38 for providing a support point 40 for the paying-out of the cable vertically into and centrally of the conduit 14. The rate of pay-out of cable 34 may be synchronized with the rate of the formation of the conduit 14, as by any suitable mechanical linkage indicated diagrammatically at 42. In this way the weight of the conduit with settable material therein will be supported to any desired degree by the cable 34 and no undue strain will be placed upon the conduit forming apparatus 12 or the joints 18 in the conduit.

The settable material may be, for example, concrete with the ingredients therefor being available on the support structure 10 as in the supply housing 44, for delivery as required into the mixing mechanism 24.

According to a still further feature of the invention, relative rotation is imparted between the conduit and the cable 34. Because the cable 34 is fixed to the conduit 14 through bottom end member 22 at point 36 the cable will be thusly twisted and will be in such twisted condition as the settble material hardens about it. Inasmuch as the twisted cable will tend to expand upon release of the twisting forces, the hardened settable material will be given an internal stress so that the resulting piling will attain a so-called "pre-stressed" condition.

Some types of available machinery for continuously forming conduit from strip material cause the conduit to rotate as it is being formed. However, to insure rotation where rotation would not otherwise be available, I provide a rotating apparatus designated generally by reference character 46, this being mounted by suitable support members 48 from the support structure 10 to prevent the rotation of the device 46 relative to the support structure 10. The supports 48 will also prevent upward or downward of the device 46 relative to 10. As above mentioned the exterior of the conduit will be characterized by corrugations or other ridges or the like running in the direction of a helix. The device 46 will have interior surfaces which are irregular in a manner corresponding to the exterior of the conduit 14 at joints 18 and corrugations 16 and will fit the conduit as a nut fits a screw-threaded bolt. Such corresponding helix configurations of the interior of the device 46 are shown as at 50 in FIGURE 2. It will now be observed that as the conduit moves downwardly relative to the device 46 it can only do so by virtue of the conduit rotating through the device 46. Thusly, the aforementioned relative rotation between the conduit 14 and the cable 34 will be achieved. The weight of the conduit and settable material will automatically insure rotation because the weight will force the conduit through the device 46.

So that the support structure 10 with the device 46 may be removed when the piling is completed, the support structure may be provided with a channel 52 extending inwardly from one edge of the structure. Moreover, the device 46 may be so constructed as to provide two cooperating members 54 and 56 which may be maintained together and in contact with the conduit by any suitable hydraulic or other device 58 which may be opened and detached from the conduit 14 at the conclusion of the making of the piling.

The foregoing detailed description of an illustrative embodiment of the invention has been given only for purposes of illustration and the true scope of the invention is to be determined from the appended claims.

What is claimed is:

1. The method of making a piling of settable material which comprises helically forming a closed bottom conduit while in a vertically supported position and filling the conduit with settable material while forming the conduit.

2. The method of claim 1 and further including the step of supporting the conduit by at least one bottom attached strand member extending internally of the conduit from within the settable material where set to a support above the conduit forming station.

3. The method of claim 2 and further including the step of imparting relative rotation between the conduit and the strand member to twist the latter.

4. Apparaus for making a piling of settable material which comprises a support structure, means mounted on the support structure for continuously forming a conduit of the spiral type from flexible strip material, said means so positioned on the support as to have the axis of the conduit extend vertically downward from the support structure, means also mounted on the support structure for paying-out a strand member fixed to the conduit to extend centrally through the conduit, and means for pouring settable material in flowable from into the upper end of the conduit as it is being formed.

5. Apparatus as in claim 4 and further including means for imparting relative rotation between the conduit and the strand member supply means so as to twist the strand member.

6. Apparatus as in claim 5 wherein the relative rotation imparting means comprises means having irregularities on the internal surface thereof in the form of a helix to engage corresponding corrugations on the outer surface of the conduit whereby the conduit is rotated as it passes through said rotational imparting means, the latter being fixed against rotation by mounting on the support structure.

7. Apparatus as in claim 4 and further including means for synchronizing the rate of cable pay-out with the rate of longitudinal formation of the conduit so that a predetermined proportion of the weight of the conduit with settable material therein is supported from the strand member pay-out means.

8. Apparatus as in claim 4 wherein the support structure is supported by flotation upon the surface of a body of water.

9. Apparatus as in claim 6 and further including means for synchronizing the rate of cable pay-out with the rate of longitudinal formation of the conduit so that a predetermined proportion of the weight of the conduit with settable material therein is supported from the strand member pay-out means.

10. Apparatus as in claim 7 wherein the support structure is supported by flotation upon the surface of a body of water.

References Cited

UNITED STATES PATENTS

| 1,615,815 | 1/1927 | Birdsey | 52—725 X |
| 1,799,918 | 4/1931 | Marsden | 61—53.52 |

FOREIGN PATENTS

German Printed Application, 1,178,798, September, 1964.

JACOB SHAPIRO, Primary Examiner

U.S. Cl. X.R.

61—53.52, 53.58, 56, 56.5, 63; 29—202.5; 264—31, 34

UNITED STATES PATENT OFFICE
CERTIFICATE OF CORRECTION

Patent No. 3,466,879                      September 16, 1969

Donald S. Justice

It is certified that error appears in the above identified patent and that said Letters Patent are hereby corrected as shown below:

In the heading to the printed specification, lines 3 and 4, "Donald S. Justice, Washington, D. C. (1816 N. Queens Lane, Arlington, Va. 22201)" should read -- Donald S. Justice, 1816 N. Queens Lane, Arlington, Va. 22201 --. Column 2, line 43, "settble" should read -- settable --; line 57, after "downward" insert -- movement --. Column 3, line 40, "from" should read -- form --.

Signed and sealed this 30th day of December 1969.

(SEAL)
Attest:

Edward M. Fletcher, Jr.                  WILLIAM E. SCHUYLER, JR.
Attesting Officer                          Commissioner of Patents